United States Patent Office 3,082,236
Patented Mar. 19, 1963

3,082,236
PEROXY ESTERS OF p-MENTHANE
HYDROPEROXIDES
Orville L. Mageli, Grand Island, and James B. Harrison, Eggertsville, N.Y., assignors to Wallace & Tiernan Incorporated, Newark, N.J.
No Drawing. Filed Apr. 29, 1959, Ser. No. 809,619
6 Claims. (Cl. 260—453)

The present invention relates to novel peroxy derivatives of paramenthane hydroperoxide and to processes for their production.

In an application for patent filed by James B. Harrison and Orville L. Mageli on December 26, 1957 under Serial No. 705,095, now abandoned, entitled Peroxy Esters of Pinanyl Hydroperoxide, certain peroxy esters of pinanyl hydroperoxide are described, and this application may be considered as a continuation-in-part thereof, insofar as the group of materials designated as pinanyl hydroperoxide may contain paramenthane hydroperoxide.

The peroxy esters of paramenthane hydroperoxide are useful as initiators in the free radical polymerization of various saturated and unsaturated monomers, as bleaching agents for flour, seeds, oils and textiles, as vulcanizing agents for natural and synthetic resins, rubbers and gums, and as a diesel fuel additive, and in various pharmaceutical applications.

In accordance with the present invention, peroxy ester derivatives of paramenthane hydroperoxide may be prepared by the reaction of the appropriate acid halide, anhydride or halocarbonate, according to the following general equations where ROOH represents paramenthane hydroperoxide,

a typical acid halide,

a typical acid anhydride and

a typical halocarbonate.

I 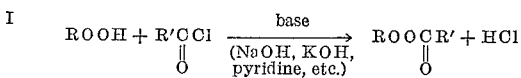

II 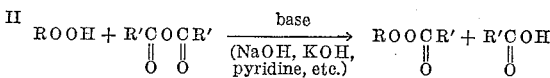

III 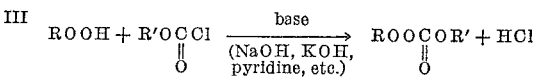

The description of the action of organic acid halide as used herein is intended to include not only the preferred carboxylic acid halide but also the anhydrides, which compounds are commonly used for acylation and have the following general formulae:

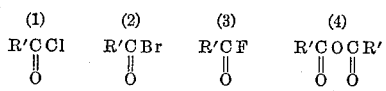

Illustrative examples of organic carboxylic acid chlorides or anhydrides which may be employed are acetyl chloride, butyryl chloride, isobutyryl chloride, hexanoyl chloride, 2-ethyl hexanoyl chloride, octanoyl chloride, decanoyl chloride, lauroyl chloride, succinyl dichloride, adipyl dichloride, sebacyl dichloride, chlorobutyryl chloride, chloroacetyl chloride, benzoyl chloride, p-chlorobenzoyl chloride, 2,4-dichlorobenzoyl chloride, p-methylbenzoyl chloride, p-tertiary-butyl-benzoyl chloride, naphthoyl chloride and phthalyl dichloride, together with the corresponding anhydrides such as acetic anhydride, butyric anhydride, isobutyric anhydride, benzoic anhydride, succinic anhydride, maleic anhydride and the like.

The halocarbonates included within the scope of this invention are those which may be represented by the general formula,

wherein X is a halogen, ordinarily chlorine or bromine, and R may be methyl, ethyl, n-propyl, isopropyl, n-butyl, sec-butyl, t-butyl, amyl, hexyl, octyl, lauryl, stearyl, allyl, methallyl, crotyl, methyl vinyl carbinyl, oleyl, propargyl, cyclohexyl, cyclopentyl, phenyl, biphenyl, xenyl, naphthyl, tolyl, xylyl, ethylphenyl, t-butylphenyl, benzyl, cinnamyl, etc.

It will be noted that R' in the above represents an organic radical which may be an alkyl group, an aryl group, an alicyclic group and that such groups may be substituted. It will be further noted that the organic radical need not be the same; if an anhydride be employed, for instance, it may be a mixed anhydride such as acetic butyric anhydride.

The reaction between the paramenthane hydroperoxide and the selected esterifying agent may be performed in aqueous solution or in the presence of an organic solvent and under alkaline conditions. In general, any substantially strong inorganic alkali soluble in water may be employed, as for instance alkali metal carbonates and hydroxides, soda ash, caustic potash, caustic soda, lithium hydroxide, etc.

If it be desired to produce the potassium salt of paramenthane hydroperoxide for the reaction, caustic potash will of course be employed as the alkali. It is also possible to employ the alkaline earth metal hydroxides, and if it be desired to produce the calcium salt of paramethane hydroperoxide, lime will be employed as the alkalizing material.

If it be preferred to perform the reaction in the presence of organic alkaline materials, heterocyclic compounds containing nitrogen are excellent, as for instance pyridine, quinoline and piperidine. Pyridine is a recommended material by reason of its solvent action as well as its alkaline nature.

Where a hydro halide is an end product of the reaction, it may be sucked off thereby to aid the course of the reaction. It will be understood that the presence of a base is not a requirement of the reaction but may be employed to facilitate the reaction. From the theoretical point of view the reactants, that is, the menthane hydroperoxide and the esterifying material, that is, acid halide anhydride or halocarbonate, are required for the reaction in stoichiometric amount and therefore in a mol ratio of 1:1. Since, however, hydrolysis is a factor tending to reduce yields, excess of the esterifying agent is preferable. Such excess may be from 10% to 60% or more and, as has been indicated above, where hydrohalide is one of the products the removal of that material also aids in increasing the yield.

Further to increase the yield, the temperature of the reaction environment should be controlled since the end products are often heat-sensitive and the temperature of the reaction mix should, in general, not exceed 50° C. and in order to obtain reasonable speeds of reaction should be above −10° C.; a preferred range of reaction temperature is therefore between −10° C. and 20° C. The novel peroxy esters are generally liquid and may be handled with relative safety providing the usual precautions are observed that are normal for organic peroxy derivatives.

The starting material in the preparation of the esters of the present invention was crude paramenthane hydroperoxide, which crude product was reacted with the esterifying agent under esterifying conditions. There is given below examples of general applicability employing an acid halide, an acid anhydride and a chloroformate as typical esterifying agents. It will be understood that the examples are given merely as illustrative and are not deemed as limitative of the invention. The actual paramenthane hydroperoxide employed in the examples was a crude product assaying 66% paramenthane hydroperoxide.

EXAMPLE 1

*p-Menthane Peroxy(Ethyl) Carbonate*

Into 13 g. of 66% p-menthane hydroperoxide dissolved in 30 ml. of anhydrous ethyl ether and 7.9 g. of pyridine was slowly added 7.6 g. (0.07 mole) of ethyl chloroformate while the reaction mixture temperature was controlled between 5 and 10° C. After the chloride addition the mixture was allowed to warm to room temperature and was stirred for one hour. At the end of this period the mixture was diluted with 100 ml. of anhydrous ethyl ether, filtered to remove pyridine hydrochloride, washed with saturated tartaric acid, water, 10% sodium bicarbonate solution, water—in this order, and dried over anhydrous magnesium sulfate. Removal of the ether under reduced pressure left 15 g. of an oil. $n_D^{30}$ 1.4406; $d_4^{30}$ 0.9442.

Calculated for $C_{13}H_{24}O_4$: M.R., 66.60; Active Oxygen 6.53%. Found: M.R., 68.49; Active Oxygen 2.86%.

EXAMPLE 2

*p-Menthane Peroxyacetate*

To a solution of 13 g. (0.05 mole) of 66% p-menthane hydroperoxide in 7.9 g. (0.1 mole) of pyridine and 30 ml. of benzene was added 5.8 g. (0.075 mole) of acetyl chloride. The addition of the chloride was made dropwise to the rapidly stirring hydroperoxide solution maintaining the temperature of the reacting mixture at 0–10° C. After the addition of the chloride, cooling was removed and the mixture stirred at room temperature for one hour. At the end of this period the solution was diluted with 100 ml. of diethyl ether, filtered to remove solid pyridine hydrochloride, washed with saturated tartaric acid, water, 10% sodium bicarbonate solution, water—in this order. The separated organic layer was dried with anhydrous magnesium sulfate. Removal of the solvent under reduced pressure left 10 g. of an oil. Distillation of the crude product gave a main fraction B.P. 50–51° C. (0.02 mm.), $n_D^{25}$ 1.4564, $d_4^{25}$ 0.962.

Calculated for $C_{12}H_{22}O_3$: M.R., 59.24; Active Oxygen 7.47%. Found: M.R., 60.22; Active Oxygen 3.27%.

This peroxyester decomposed at 114–115° C. with vigorous evolution of smoke and gas when heated at the rate of 4° C. per minute.

EXAMPLE 3

*p-Menthane Peroxybenzoate*

Into a cold (0–5° C.) solution of 8.6 g. (0.05 mole) of p-menthane hydroperoxide (13 g. of 66%) in 25 ml. of diethyl ether and 7.9 g. (0.1 mole) of pyridine was added, slowly, 9.8 g. (0.07 mole) of benzoyl chloride maintaining the temperature below 10° C. After the addition, the temperature was allowed to rise to room temperature and the mixture was stirred for one hour. At the end of this period it was diluted with 100 ml. of diethyl ether, filtered to remove pyridine hydrochloride and washed with the following agents: saturated tartaric acid, water, 10% sodium bicarbonate, water. The organic phase was dried over anhydrous magnesium sulfate. Removal of the ether under reduced pressure left 14 g. of an oil $n_D^{30}$ 1.5028, $d_4^{30}$ 1.0176.

Calculated for $C_{17}H_{24}O_3$: M.R., 79.85; Active Oxygen 5.77%. Found: M.R., 80.55; Active Oxygen 2.55%.

EXAMPLE 4

*p-Menthane Peroxylaurate*

Into a solution of 13 g. of 66% p-menthane hydroperoxide (0.05 mole) in 7.9 g. of pyridine and 30 ml. of anhydrous ethyl ether was added dropwise 15.3 g. (0.07 mole) of lauroyl chloride. The temperature was maintained below 10° C. during the chloride addition and allowed to warm to room temperature during the subsequent one hour stirring period. Dilution of the reaction mixture with 100 ml. of ether, removal of the solid pyridine hydrochloride by filtration, thorough washing of the organic material (saturated tartaric acid, water, bicarbonate solution, water), drying of the etheral solution over anhydrous magnesium sulfate, filtration and removal of the solvent under reduced pressure left 20 g. of an oil $n_D^{30}$ 1.4498 $d_4^{30}$ 0.8936.

Calculated for $C_{22}H_{42}O_3$: M.R., 106.57; Active Oxygen 4.50%. Found: M.R., 106.91; Active Oxygen 2.07%.

EXAMPLE 5

*p-Menthane Peroxyisobutyrate*

Into a mixture of 8.6 g. (0.05 mole) p-menthane hydroperoxide (13 g. of 66%), 7.9 g. of pyridine and 30 ml. of anhydrous ethyl ether was added dropwise 7.5 g. (0.07 mole) of isobutyryl chloride. The reaction temperature was maintained between 5 and 10° C. during the addition and was allowed to rise to room temperature during the subsequent one hour stirring period. Isolation of the product by the method outlined in previous examples left 8 g. of an oil $n_D^{30}$ 1.4391, $d_4^{30}$ 0.9247.

Calculated for $C_{14}H_{26}O_3$: M.R., 69.62; Active Oxygen 6.6%. Found: M.R., 69.14; Active Oxygen 3.18%.

EXAMPLE 6

*p-Menthane Peroxy (Isobutyl) Carbonate*

Into a mixture of 13 g. of 66% p-menthane hydroperoxide (0.05 mole), 7.9 g. of pyridine and 30 ml. of ethyl ether was added dropwise with rapid stirring 9.6 g. of isobutyl chlorocarbonate. The reaction temperature during the addition was maintained in the range of 5–10° C. and was allowed to warm to room temperature during the subsequent one hour stirring period. Dilution of the mixture with 100 ml. of ethyl ether and isolation of the product by the previously indicated method led to 15 g. of an oil. $n_D^{30}$ 1.4428, $d_4^{30}$ 0.9311.

Calculated for $C_{15}H_{28}O_4$: M.R., 75.84; Active Oxygen 5.85%. Found: M.R., 77.74; Active Oxygen 2.51%.

EXAMPLE 7

*Di-p-Menthane Diperoxyphthalate*

Into a mixture of 30 ml. of water and the sodium salt of 12.6 g. of 70% p-menthane hydroperoxide (0.05 mole) was added dropwise with stirring 5.1 g. (0.025 mole) of phthaloyl dichloride. During the addition the reaction temperature was kept at 15° C. but was allowed to rise to room temperature during the one hour stirring period. The pH of the reaction was maintained at 10 or higher by occasional adjustments with 50% sodium hydroxide solution. The peroxyester derivative was extracted from the aqueous phase with diethyl ether, the ethereal extract washed with water until neutral and then dried over anhydrous magnesium sulfate. After filtration and removal of the solvent under reduced pressure, there remained 11 g. of a thick oil. $n_D^{25}$ 1.5074, $d_4^{25}$ 1.055.

Calculated for $C_{28}H_{42}O_6$: M.R., 126.16; Active Oxygen 6.75%. Found: M.R., 133.40; Active Oxygen 3.30%.

When heated at the rate of 4° C. per minute, this material decomposed with a puff of smoke at 100° C.

EXAMPLE 8

Di-p-Menthane Diperoxysuccinate and p-Menthane Peroxy Acid Succinate

These peroxyester derivatives were prepared by adding dropwise with stirring 4.3 g. (0.025 mole+10% excess) of succinyl chloride to a slurry of the sodium salt of 12.6 g. of p-menthane hydroperoxide (70%) in 30 ml. of water at 15° C. The temperature of the reaction mixture was allowed to rise to 25° after the addition and was stirred for one hour. The pH was adjusted to 10 or higher by means of additions of 50% sodium hydroxide. The reaction products were extracted from the aqueous phase with two 50 ml. portions of diethyl ether. The combined extracts were washed with water until neutral and dried over anhydrous magnesium sulfate. Removal of the solvent under reduced pressure left 7 g. of a semi-solid material. This was separated into solid and liquid components by dilution with methanol and cooling. After standing at —15° C. for one week the solid (neutral) compound was filtered off and twice recrystallized from petroleum ether. It melted at 102–103° C.

Calculated for the di-p-menthane diperoxysuccinate, $C_{24}H_{42}O_6$: Active Oxygen 7.5%. Found: Active Oxygen 6.9%.

This product decomposed with a puff at 122° C. when heated at the rate of 4° C./min. The liquid residue (after removal of the solid) was freed of methanol by evaporation under reduced pressure (0.1 mm.) at room temperature (25° C.). An oil was obtained. $n_D^{25}$ 1.4711, $d_4^{25}$ 0.979.

Calculated for the p-menthane peroxy acid succinate, $C_{14}H_{24}O_5$: M.R., 70.05; Active Oxygen, 5.99%. Found: M.R., 77.50; Active Oxygen 4.81%.

This product decomposed mildly at 112–115° C. with evolution of gas, when heated at the rate of 4° C./min.

TABLE 1
*Peroxyester Derivatives of p-Menthane Hydroperoxide*

| Compound [1] | $n_D^{30}$ | $d_4^{30}$ | MR Cal'd | MR Found | Act. (O) Percent Cal'd | Act. (O) Percent Found |
|---|---|---|---|---|---|---|
| $C_6H_5COR$ | 1.5028 | 1.0176 | 79.85 | 80.55 | 5.77 | 2.14 |
| $C_{11}H_{25}COR$ | 1.4498 | 0.8936 | 106.57 | 106.91 | 4.50 | 2.07 |
| $C_2H_5O-CO-R$ | 1.4406 | 0.9442 | 66.60 | 68.49 | 6.53 | 2.86 |
| $(CH_3)_2CHCH_2OCOR$ | 1.4428 | 0.9311 | 75.84 | 77.74 | 5.85 | 2.51 |
| $(CH_3)_2CHCOR$ | 1.4391 | 0.9247 | 69.62 | 69.14 | 6.6 | 2.42 |
|  | $n_D^{25}$ | $d_4^{25}$ |  |  |  |  |
| $C_6H_4(COR)_2$ | 1.5074 | 1.055 | 126.16 | 133.40 | 6.75 | 3.30 |
| $C_2H_4(COR)_2$ (M.P. 102–103° C.) |  |  |  |  | 7.50 | 6.90 |
| $HOOC(C_2H_4)COR$ | 1.4711 | 0.979 | 70.05 | 77.50 | 5.99 | 4.81 |
| $CH_3CO-R$ | 1.4564 | 0.962 | 59.24 | 60.22 | 7.47 | 3.27 |

[1] R is one of the isomers of $C_{10}H_{19}-O-O-$, the most prevalent being:

$$CH_3-CH \begin{matrix} CH_2-CH_2 \\ CH_2-CH_2 \end{matrix} CH-C \begin{matrix} CH_3 \\ O-O- \\ CH_3 \end{matrix}$$

What is claimed is:
1. Peroxy esters of p-menthane hydroperoxide selected from the group consisting of p-menthane peroxyacetate, p-menthane peroxybenzoate, p-menthane peroxyethyl carbonate, di-p-menthane diperoxyphthalate and di-p-menthane diperoxysuccinate.
2. p-menthane peroxyacetate.
3. p-menthane peroxybenzoate.
4. p-menthane peroxyethyl carbonate.
5. Di-p-menthane diperoxyphthalate.
6. Di-p-menthane diperoxysuccinate.

References Cited in the file of this patent

UNITED STATES PATENTS

| | | |
|---|---|---|
| 2,374,789 | Strain | May 1, 1945 |
| 2,567,615 | Milas | Sept. 11, 1951 |
| 2,608,571 | Rust et al. | Aug. 26, 1952 |
| 2,661,363 | Dickey | Dec. 1, 1953 |
| 2,698,863 | Dickey | Jan. 4, 1955 |
| 2,735,870 | Fisher et al. | Feb. 21, 1956 |
| 2,824,138 | Wystrach et al. | Feb. 18, 1958 |

OTHER REFERENCES

Bergmann: "Acetylene Chemistry," page 80 (1948). (Copy in Sci. Library.)